United States Patent Office 2,911,438
Patented Nov. 3, 1959

2,911,438
OXYGEN CARRIERS AND METHOD OF MAKING THEM

Kalman von Szombathy, Eltville, Rheingau, Germany, assignor to Andre von Szombathy, Wiesbaden, Germany No Drawing. Application June 29, 1954
Serial No. 440,294

3 Claims. (Cl. 260—512)

This invention relates to the manufacture of oxygen carriers and the application thereof to the dehydrogenation and oxidation of sulfur compounds.

According to the present invention, in order to carry out catalytic dehydrogenation or oxidation of sulfur compounds in solution, oxygen carriers, i.e. oxygen-carrying catalytic materials are used. The sulfonated phenolic starting materials used in the manufacture of such oxygen carriers contain one or more enediol groups, or nuclear substituted amino, methyl or carboxyl groups or chlorine atoms, which, during the production of the oxygen carrier, are first replaced by enediol groups and are converted by further combination with oxygen and water into quinonoid intermediate products which are then converted into a compound of hydroperoxide character.

These oxygen carriers are homogeneous oxido-redox systems with high redox-potential, which, in a preferably aqueous solution, in the presence of molecular oxygen, are capable of dehydrogenating compounds or converting them into their higher or highest oxidation stages. By taking up oxygen, this oxygen carrier can easily be regenerated so that it can again easily release the activated oxygen to the substratum.

In an aqueous solution which contains oxidizable or dissolved gaseous sulfur compounds, only small quantities (about 0.01 percent) of this oxygen carrier are used, and during the oxidation process the solution is continuously treated and regenerated, either in the same or in a separate working stage, by means of molecular oxygen or air. The solution treated in this manner remains permanently active and the oxidation process proceeds uninterruptedly at a practically utilizable speed and at constant redox potential.

Compounds, such as the reductones (Euler), used for the manufacture of such oxygen carriers, contain, in their simplest form, one or more enediol hydroxyl groups and possess reducing properties; that is to say they are negative catalysts. An example of this is the "pyrocatechol-quinone system," which only functions in the presence of reducing compounds such as sulfites, as is well known in the process of developing silver plates in photochemistry.

The preferred starting materials for the manufacture of the oxygen carriers, according to the present invention, are the monohydric phenols substituted by amino groups, for example amino or diamino phenols and the like, as well as dihydric phenols, such as dihydroxybenzenes and their derivatives, including their quinones, or trihydric phenols. Other phenol compounds, in which the enediol group is substituted by methyl or carboxyl groups or chlorine atoms, are also suitable. In a corresponding manner there can be used cresols or mono- and poly-carboxylic acids, such as salicylic acid, aminosalicylic acid, tannins or hydrolyzed vegetable tanning materials, when these are converted, after splitting off of the sugar residue, into polycarboxylic acids, these tanning materials being obtained from oak bark, grape pips or horse chestnuts. Saponines or chlorobenzenes may also be used. Sulfonic acids of the aromatic hydrocarbons as well as phenol sulfonic acids, sulfanilic acids and naphthols are also suitable.

These starting materials are, according to the present invention, so far as they do not already contain sulfonic acid groups, first sulfonated in a known manner; for example, with highly concentrated sulfuric acid at a temperature of about 100° C. to produce the sulfonic acids of the specified starting materials. These sulfonic acids are then preferably converted into their alkali or ammonium salts. By the introduction of the sulfonic acid group, the resulting oxygen carrier is stabilized against the effects of electrolytes and of variations of the pH-value of the solutions, and does not polymerize.

In the second stage, after removal of the free acids, these sulfonates are dissolved in water and treated in the presence of the necessary quantity of alkali hydroxide or ammonia for combination with the carboxyl or chlorine substituents, and of an additional excess of $1/10$ mol or more of alkali hydroxides or ammonia, either at room temperature or at a more elevated temperature. Advantageously the treatment takes place at 30° C. or above, preferably under pressure, with molecular oxygen or air well distributed throughout the mass until the absorption of oxygen is complete. The amount of the absorption of oxygen and the point where it is complete are determined by a volumetric estimation of the oxygen in the liquid. When the gas volume becomes constant, the absorption of oxygen is complete. Both the solution and also the dried and pulverized material are of unlimited stability.

If the starting material contains, instead of the enediol hydroxyl groups, methyl or carboxyl groups or chlorine atoms, then the absorption of oxygen is conducted in the presence of small quantities of a previously prepared oxygen carrier and the reaction is advantageously promoted by elevated temperatures or pressures. In this manner there is produced, in the final stage, a dark-brown, syrup-like solution which dissolves in water in all proportions, exhibits a strong fluoroescence, and gives no precipitation with acids, alkalies, ammonia or with electrolytic salts. This is in contradistinction to the non-sulfonate type of oxygen carrier. In this manner an oxygen carrier is obtained in the crude state which is directly utilizable for many technical purposes.

As compared with the specified starting materials (reductones) this oxygen carrier has no reducing properties but is rather an oxido-redox system, developed by way of a number of intermediate compounds. It acts to liberate iodine in acid solutions, dehydrogenates compounds in solution or transfers the activated oxygen to the substratum and converts the latter, according to the temperature or pressure employed, into oxidation products. It also easily takes up oxygen again and is thus regenerated in the presence of molecular oxygen and constitutes a positive catalyst with high redox potential and a high speed of reaction. By comparison with the above mentioned reductones (Euler) there redox systems will be called "oxidones."

It is immaterial whether these sulfonated oxygen carriers are derived from starting materials containing hydroxyl, amino, carboxyl or chlorine substituents. During the treatment, the amino group is converted to nitric oxide, the methyl group first to carboxyl and then to carbon dioxide and appears in the solution as carbonate or bicarbonate, while the chlorine atom appears as hydrochloric acid or as a chloride, so that in the final stage a sulfonated aromatic phenolic compound of hydroperoxide character is produced which, in a dehydrogenation or oxidation process, in the presence of water and molecular oxygen, is continuously regeneratable and permanently retains its oxidoredox potential. This is shown in the case of the desulfurization of the industrial gases containing hydrogen sulfide or in the oxidation of sulfur-containing alkali or ammonium compounds, including thiocyanates, to sulfates and elementary sulfur.

The oxygen carrier thus produced can be advantageously used in processes which are concerned with a proposed oxidation or dehydrogenation which can be regulated by temperature or pressure. Thus selenium, iodine, or hydrogen sulfide or hydrosulfide groups in inorganic or organic compounds can be dehydrogenated; or carbohydrates can be oxidized to saccharide acid or gluconic acid; or aldehydes to ketones; or alcohols to acids.

In all cases the oxidations are advantageously carried out in aqueous solution. When a stabilization of the pH-value of the solution is necessary, water soluble phosphates are used. Ammonia or ammonium salts may also advantageously be used.

Since the oxygen carrier possesses hydroperoxidic properties, it is of advantage if the oxygen liberation in the solution is promoted by the presence of phosphates or thiosulfates, or by traces of metal salts having plural valences, as for example iron or manganese or, especially, water soluble chromium salts.

According to the present invention the dehydrogenation or oxidation of inorganic or organic sulfur compounds is carried out with this oxygen carrier. Such sulfur compounds include hydrogen sulfide or sulfites, or such compounds as contain in their structure a sulfide or hydrosulfide group or a sulfide dioxide group or both together, as in the case of thiosulphates, di- or polythionates, cysteins, thioxanates and the like. As end product there is obtained from these compounds, by way of intermediate stages which are dependent upon temperature, elementary sulfur or sulfate or both.

The following examples illustrate the invention, the parts being by weight:

I. OXYGEN CARRYING CATALYTIC MATERIALS

Example 1

By the simplest method of manufacture 25 parts of dihydroxybenzene are introduced into a vessel provided with a stirring mechanism and containing 35 parts of a 94% concentration of sulfuric acid. The mixture is heated to about 80° C., in uniform portions, for about 2 hours with slow stirring. The specified starting materials dissolve rapidly and the temperature rises gradually to 100° C.

The temperature should not rise much above 100° C. and, on a large scale, time must be taken for adequate cooling. When the starting material, advantageously a dihydroxybenzene, is introduced into the sulfuric acid and is completely dissolved, the mixture is maintained for about 6 hours at 95–100° C. In this manner a complete sulfonation of the starting material is achieved. Any other known method can, however, be used for the sulfonation.

The heavy, clear liquid is then directly neutralized with caustic soda, while maintaining good cooling. The product thus produced is directly applicable for many technical purposes after treatment with molecular oxygen; however, it still contains much Glauber's salt. If the presence of this substance is not desired, then there is added to the liquid, instead of caustic soda, a saturated and very well cooled common salt solution prepared from 35 parts of common salt. The temperature of the solution should not rise above 20° C. and during the addition of the initially fairly unstable solution, the solution should be slowly stirred. The resulting solution is then allowed to stand over-night without stirring and the product solidifies to a solid, white, easily filterable paste, which, after filtration, is washed with a saturated common salt solution or with concentrated hydrochloric acid until the free sulfuric acid is removed. The liquid or filter cake, obtained by direct neutralization with caustic soda, is then treated, in a vessel provided with a rapid stirring mechanism and aeration device, with 30 parts of water and 9 parts of caustic soda, and with air or oxygen at room temperature. If necessary, the oxygen treatment takes place with cooling until a test portion indicates the completion of the absorption of the oxygen. The extent of the oxygen absorption is followed in test portions of the liquid by gas-volumetric determination and when the gas volume is constant the absorption of the oxygen is complete. The resulting solution contains about 40% of oxygen carrier and is ready for immediate use for many technical purposes. It can also be evaporated and dried. If desired, caustic potash or ammonia may be substituted for the caustic soda in equivalent amounts. The dihydroxybenzene may also be replaced by aminophenol or benzoquinone in equivalent amounts. The product is of unlimited stability and is immediately soluble in water.

Example 2

The same constituents and proportions are used as in Example 1, except that 27 parts of diaminophenol are substituted for 25 parts of dihydroxybenzene. The product obtained is similar to that of Example 1.

Example 3

The same conditions and proportions are used as in Example 1, except that 29 parts of polyhydric phenol are substituted for the 25 parts of dihydroxybenzene. The product obtained is similar to that of Example 1.

Example 4

The same conditions and proportions are used as in Example 1, except that 41 parts of a phenylene diamine are substituted for the 25 parts of dihydroxybenzene. The product obtained is similar to that of Example 1.

Example 5

The same conditions and proportions are used as in Example 1, except that 33 parts of a naphthol are substituted for the 25 parts of dihydroxybenzene. The product obtained is similar to that of Example 1.

Example 6

The same conditions and proportions are used as in Example 1, except that 30 parts of aminonaphthol are substituted for the 25 parts of dihydroxybenzene. The product obtained is similar to that of Example 1.

Example 7

The same conditions and proportions are used as in Example 1, except that 36 parts of a naphthoquinone are substituted for the 25 parts of dihydroxybenzene. The product obtained is similar to that of Example 1.

Example 8

The same conditions and proportions are used as in Example 1, except that 160 parts of a dihydronaphthalene are substituted for the 25 parts of dihydroxybenzene. The product obtained is similar to that of Example 1.

Example 9

For the preparation of a pure oxygen carrier the sulfonate cake obtained is dried, pulverized and leached out with absolute ethyl or methyl alcohol. After driving off the alcohol, this operation is repeated and the residue dissolved in about 3 times the quantity of water. After the addition of about 10 parts of ammonia, the solution is treated with air or oxygen under pressure at room temperature until the absorption of oxygen is complete. The solution is then evaporated and the product dried and pulverized. The oxygen carrier obtained in this manner is free from ammonia and other impurities. Whether in the form of a solution or after drying this oxygen carrier is of unlimited stability.

*Example 10*

Raw materials containing either carboxyl or methyl groups or chlorine atoms, for example, 31 parts of salicylic acid, are treated as described in Example 1 with 35 parts of highly concentrated sulphuric acid, and the sulphonate produced are treated, as described in Example 1, at 80–100° C., if necessary under pressure, with air or oxygen.

*Example 11*

The same constituents and proportions are used as in Example 10, except that 35 parts of aminosalicylic acid are substituted for the 31 parts of salicylic acid. The product obtained is similar to that of Example 10.

*Example 12*

The same constituents and proportions are used as in Example 10, except that 48 parts of a hydrolyzed tanning material made either from grape pips, horse chestnuts or oak bark is substituted for the 31 parts of salicylic acid. The product obtained is similar to that of Example 10.

*Example 13*

The same constituents and proportions are used as in Example 10, except that 113 parts of chlorobenzene are substituted for the 31 parts of salicylic acid. The product obtained is similar to that of Example 10.

*Example 14*

The same constituents and proportions are used as in Example 10, except that 146 parts of dichlorobenzene are substituted for the 31 parts of salicylic acid. The product obtained is similar to that of Example 10.

*Example 15*

The same constituents and proportions are used as in Example 10, except that 163 parts of chloronaphthalene are substituted for the 31 parts of salicylic acid. The product obtained is similar to that of Example 10.

Phenolic reductones containing sulfonic acid groups, such as 40 parts of p-methylaminophenol sulfonic acid or 210 parts of quinone sulfate or corresponding quantities of other similar materials are likewise converted into oxygen carriers as described in Example 1. Since these starting materials already contain a sulfonic acid group, the introduction thereof becomes unnecessary.

II. DEHYDROGENATION AND OXIDATION REACTIONS

*Example 16*

Gases containing hydrogen sulphide, such as the waste gases from the manufacture of barium carbonate or barium sulfide, waste gases from carbon disulfide manufacture, artificial silk manufacture and so on, are directly mixed with air or oxygen and washed in a tower or mechanical washer with a wash liquor containing, dissolved in water, about 0.01–1.0 percent by weight of oxygen carrier and small quantities of alkali or ammonium thiosulfate or alkali sulfate or traces of water soluble salts of polyvalent metals, advantageously chromates. For the purpose of reduction of the surface tension, there are also contained small quantities (about 0.005–0.01 percent by weight) of fatty alcohol sulfonates or naphthalene mono or di-sulfonates, xylene or toluene sulfonates, or similar sulfonates. The gases are advantageously diluted with air to such an extent that they contain, at the most, about 5 percent by volume of hydrogen sulfide. In one stage, these gases are treated with about 40 litres of the wash liquor per C.B.M. of gas mixture. Using a correctly dimensioned washer, a practically complete desulfurization of the gas is attained at room temperature.

The hydrogen sulfide is dehydrogenated to elementary sulfur which is deposited as finely divided sulfur of great biological activity and of high surface activity. Among other purposes, this product can be advantageously used in animal fodder, as fertilizer, or as a plant protecting agent. The precipitated sulfur is soluble in carbon disulfide and has colloidal properties, so that it is taken up well by the organism.

It is removed from the wash liquor by filtration or flotation and the remaining solution is continuously returned to the desulfurization process.

*Example 17*

A wash liquor, as described in Example 16, is used in a desulfurization process of gases produced in the distillation of coal, generator gases or synthetic gases or the like. In this process the pH value must be maintained between 8–9, advantageously 8.7, adjustment being preferably carried out with ammonia or gas liquor. The quantity of ammonia necessary for this purpose depends upon the acid constituents of the gas and the adjustment can be carried out in the gas stream or by regulated addition of ammonia to the solution.

Air or oxygen cannot be directly admixed with these gases and the process must necessarily be carried out in two stages. The washing of the gas is carried out in a tower or mechanical washer with about 40 litres of liquid per C.B.M. gas whereby a practically complete desulfurization is achieved. The liquid is then passed to a second stage in which it is treated in tower or mechanical washer with a quantity of air corresponding to about 5 percent of the gas treated. The sulfur is precipitated in finely divided form and is removed from the solution by filtration or flotation, the remaining solution being recycled back to the first stage and remaining in uninterrupted circulation. Only small, unavoidable mechanical losses of oxygen carrier arise.

Owing to the increasing alkalinity of the solution with rising temperature, there are formed in the solution sulfides or hydrosulfides and oxidation products such as thiosulfates, polythionates and sulfates. The wash liquor becomes detrimentally enriched in these salts, as a result of which the absorption of the hydrogen sulfide and the oxygen gradually deteriorates. The formation of these oxidation products can be prevented, however, when the temperature is maintained low, that is between 15–20° C., and it is possible to maintain the sulfur oxidation products at a constant concentration. At a temperature of about 15° C., the formation of oxidation products is reduced to a minimum, especially when the treatment of the solution is carried out with oxygen, with air containing carbon dioxide or with flue gases purified from dust and sulfur dioxide. The presence of carbon dioxide prevents the sulfide formation in the solution, the hydrogen sulfide remains free, and accordingly a wash liquor of a low salt content is produced. A practically complete desulfurization of the gas with practically complete recovery of sulfur is thereby achieved.

*Example 18*

This is an example of the conversion of alkali metal or ammonium sulfide or polysulfide liquors completely to elementary sulfur without the formation of other sulfur products.

One gram of oxygen carrier, about 0.01 gram of alkali chromate and 0.005 gram of naphthalene propionate sulfonic acid, per litre, are added to a solution containing sulfide, and the liquor is then treated in a Tourill system or in countercurrent, in a tower or mechanical washer, with air containing carbon dioxide or with purified flue gas. The temperature of the liquor is maintained constant below 20° C. The carbon dioxide liberates hydrogen sulfide and thus prevents formation of thiosulfate or polythionate. The liberated hydrogen sulfide is dehydrogenated smoothly to elementary sulfur which is then collected as it leaves the Tourill system or tower in the form of a paste. It is then filtered. With correct dimensioning of the plant, the hydrogen sulfide is completely converted into sulfur.

*Example 19*

Alkali thiosulfate or polythionate liquors are treated with 1 gram of oxygen carrier, 0.01 gram of alkali chromate and 0.005 gram of naphthalene propionate sulfonic acid per litre. In a Tourill system or a mechanical washer, a vigorous current of air is passed through the solution at room temperature. At the same time there is added to the solution during the process a uniformly distributed slow stream of about 0.1 percent sufuric acid, the necessary quantity of sulfuric acid amounting to about ½% of the total quantity of thiosulfate or polythionate. The sulfuric acid induces reaction which takes place fairly sluggishly at room temperature. During the process sulfur dioxide is continuously liberated and oxidized to sulfuric acid. When the plant is correctly dimensioned there is no loss of liberated sulfur dioxide, and its conversion to sulfuric acid calls for the feeding in of less sulfuric acid than otherwise needed. The pH value of the liquor is about 3.5. The current of air flotates the very finely divided sulfur which separates as a result of the action of the acid on the thiosulfate or polythionate, and carries this sulfur through the process. Liquor leaving the end of the system contains only elementary sulfur and alkali or ammonium sulfate.

In a similar manner alkali or ammonium thiocyanates can be worked up to elementary sulfur and sulfate.

The sulphonated phenolic starting materials (reductones), that is to say the reducto-redox systems, necessary for the production of the oxygen carrier, can be converted, without particular difficulty, into an oxido-redox system (oxidone). The possibility is thus provided of employing the sulfonated starting materials directly in an oxidation process, as for example in a gas purification process; and to develop the oxygen carrier in the process itself by treatment with air or oxygen, provided that sufficient alkali is present in the solution. The direct employment of these substances is of advantage in some processes in which oxygen can be directly employed.

Obviously many modifications and variations of the present invention are possible in the light of the above teachings. It is, therefore, to be understood that within the scope of the appended claims the invention may be practiced otherwise than as specifically described.

What is claimed is:

1. A process for producing an oxygen-carrying catalytic material which comprises sulfonating a phenolic compound containing a nuclear substituted radical selected from the group consisting of amino, methyl, carboxyl and chlorine, and treating an alkaline aqueous solution of the sulfonated product with molecular oxygen at a temperature at least as high as 30° C. until absorption of oxygen is complete.

2. A process for producing an oxygen-carrying catalytic material which comprises treating an alkaline aqueous solution of a sulfonated phenolic compound containing at least one enediol group with molecular oxygen at a temperature at least as high as 30° C. until absorption of oxygen is complete.

3. An oxygen-carrying catalytic material consisting essentially of a sulfonated aromatic phenolic compound containing an enediol group that has been treated in alkaline aqueous solution with molecular oxygen at a temperature at least as high as 30° C. until absorption of oxygen is complete.

References Cited in the file of this patent

UNITED STATES PATENTS

| | | |
|---|---|---|
| 1,957,253 | Eymann | May 1, 1934 |
| 2,433,394 | Paden et al. | Dec. 30, 1947 |